United States Patent
Kulkarni

(10) Patent No.: US 11,789,952 B2
(45) Date of Patent: Oct. 17, 2023

(54) RANKING ENTERPRISE SEARCH RESULTS BASED ON RELATIONSHIPS BETWEEN USERS

(71) Applicant: salesforce.com, inc., San Francisco, CA (US)

(72) Inventor: Swapnil Sanjay Kulkarni, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 806 days.

(21) Appl. No.: 16/143,338

(22) Filed: Sep. 26, 2018

(65) Prior Publication Data

US 2020/0097560 A1 Mar. 26, 2020

(51) Int. Cl.
*G06F 16/00* (2019.01)
*G06F 16/2457* (2019.01)
*G06F 16/248* (2019.01)
*G06F 16/28* (2019.01)
*G06F 16/9535* (2019.01)

(52) U.S. Cl.
CPC ...... *G06F 16/24578* (2019.01); *G06F 16/248* (2019.01); *G06F 16/288* (2019.01); *G06F 16/9535* (2019.01)

(58) Field of Classification Search
CPC ............. G06F 16/24578; G06F 16/248; G06F 16/288; G06F 16/9535; G06Q 30/0201; G06Q 50/01
See application file for complete search history.

(56) References Cited

U.S. PATENT DOCUMENTS

| | | |
|---|---|---|
| 8,311,875 B1 | 11/2012 | Lloyd |
| 8,898,150 B1 | 11/2014 | Kuramochi et al. |
| 8,978,114 B1 | 3/2015 | Kaushik et al. |
| 2006/0253428 A1 | 11/2006 | Katariya et al. |
| 2008/0114751 A1 | 5/2008 | Cramer et al. |
| 2008/0313574 A1 | 12/2008 | Aravamudan et al. |
| 2010/0088151 A1 | 4/2010 | Kim et al. |
| 2010/0169343 A1* | 7/2010 | Kenedy ............... G06F 16/9535 707/758 |

(Continued)

FOREIGN PATENT DOCUMENTS

WO    WO 2018/156373 A1    8/2018

OTHER PUBLICATIONS

United States Office Action, U.S. Appl. No. 15/857,613, dated Dec. 3, 2019, 20 pages.

(Continued)

*Primary Examiner* — Noosha Arjomandi
(74) *Attorney, Agent, or Firm* — Fenwick & West LLP

(57) ABSTRACT

A system stores records of different entity types and processes search queries to determine search results comprising records that match the search query. The system receives a search query comprising search keywords from a source user. The system identifies a target user based on a search keyword received in the search query. The system determines a relationship between the source user and the target user. The system determines a relationship strength score for the relationship between the source user and the target user and ranks the search results based on the relationship strength score. The system provides the search results to the source user.

20 Claims, 11 Drawing Sheets

(56) References Cited

U.S. PATENT DOCUMENTS

| | | | |
|---|---|---|---|
| 2010/0299319 A1* | 11/2010 | Parson | G06Q 10/00 |
| | | | 707/E17.017 |
| 2012/0209840 A1 | 8/2012 | Gur | |
| 2013/0179252 A1 | 7/2013 | Dong et al. | |
| 2013/0204825 A1 | 8/2013 | Su | |
| 2014/0046934 A1 | 2/2014 | Zhou et al. | |
| 2014/0172855 A1* | 6/2014 | Arnoux | G06F 16/285 |
| | | | 707/737 |
| 2014/0214945 A1* | 7/2014 | Zhang | H04L 67/306 |
| | | | 709/204 |
| 2015/0006232 A1* | 1/2015 | Anaby-Tavor | G06Q 10/06316 |
| | | | 705/7.26 |
| 2015/0101053 A1 | 4/2015 | Sipple | |
| 2016/0063098 A1 | 3/2016 | Kawanaka et al. | |
| 2016/0140230 A1 | 5/2016 | Villeneuve et al. | |
| 2016/0300141 A1 | 10/2016 | Veeraragavan et al. | |
| 2016/0371625 A1* | 12/2016 | Mosley | G06Q 10/06398 |
| 2017/0024455 A1 | 1/2017 | Powell et al. | |
| 2017/0213272 A1* | 7/2017 | Mowatt | G06Q 30/0204 |
| 2017/0236079 A1* | 8/2017 | Venna | G06F 16/2428 |
| | | | 705/4 |
| 2017/0255476 A1 | 9/2017 | Whitney et al. | |
| 2018/0268065 A1* | 9/2018 | Parepally | G06N 20/00 |
| 2019/0005021 A1* | 1/2019 | Miller | G10L 15/26 |
| 2019/0005024 A1* | 1/2019 | Somech | H04L 67/306 |
| 2019/0155914 A1 | 5/2019 | Xiao et al. | |
| 2019/0156212 A1* | 5/2019 | Bottaro | G06N 5/022 |
| 2019/0197190 A1* | 6/2019 | Zhang | G06N 5/022 |
| 2019/0258721 A1* | 8/2019 | Guo | H04L 67/535 |
| 2019/0339965 A1 | 11/2019 | Garvey et al. | |
| 2020/0005196 A1 | 1/2020 | Cai et al. | |

OTHER PUBLICATIONS

Craswell, N. et al., "Random Walks on the Click Graph," Proceedings of SIGIR 2007, Jul. 2007, eight pages.

Huang, J. et al., "No Clicks, No Problem: Using Cursor Movements to Understand and Improve Search," CHI 2011, May 7-12, 2011, ten pages.

Wue, G. et al., "Optimizing Web Search Using Web Click-through Data," CIKM'04, Nov. 8-13, 2004, pp. 118-126.

United States Office Action, U.S. Appl. No. 15/857,613, dated Mar. 26, 2020, 27 pages.

United States Office Action, U.S. Appl. No. 16/118,410, dated Jun. 16, 2020, 19 pages.

United States Office Action, U.S. Appl. No. 16/118,410, dated Jan. 28, 2021, 17 pages.

United States Office Action, U.S. Appl. No. 16/118,410, dated Sep. 8, 2021, 24 pages.

United States Office Action, U.S. Appl. No. 16/118,410, dated Apr. 13, 2022, 24 pages.

* cited by examiner

RANKING ENTERPRISE SEARCH RESULTS BASED ON RELATIONSHIPS BETWEEN USERS

BACKGROUND

Field of Art

The disclosure relates in general to ranking search results and in particular to ranking of records for an enterprise search system based on relationships between users.

Description of the Related Art

Online systems used by enterprises, organizations, and businesses store large amounts of information. These systems allow users to perform searches. An online system deploys a search engine that identifies records matching a search query, scores the search results using various signals, and returns a list of ranked search results. Search engines typically rank search results based on criteria such as the frequency with which search terms occur within documents, popularity of documents, portions of documents where the keywords occur, and so on. The search engine ranks search results in an order based on relevance of the individual search results. For example, a popular document may appear higher in the search results compared to a document that very few users have accessed in the past. However, different users may be interested in different types of results. For example, two users may search for the same topic, but one user may be interested in latest news related to the topic whereas another user may be interested in literature describing that topic. Furthermore, the search relevance for a user may change over time, for example, as activities of the user within an enterprise change over time. A user working on a particular project at a given time may be interested in particular type of search results. However the same user working on a different project at a different point in time may be interested in different kind of search results. Conventional techniques for performing searches do not account for such changes in the context over time and therefore provide results that may not be relevant to the user. As a result, these search engines provide poor user experience.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality.

The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

System Overview

Figure 1A:
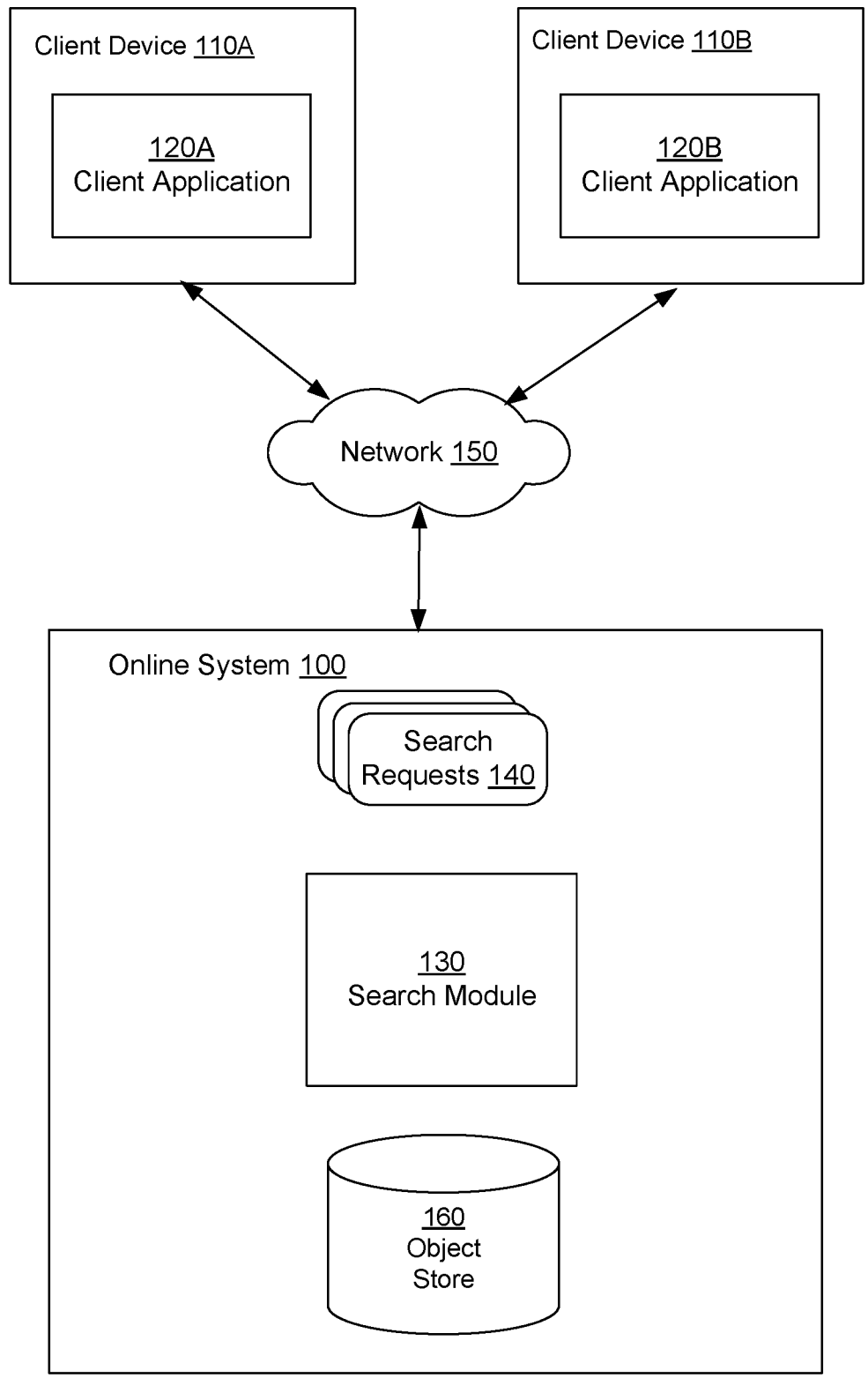
FIG. 1A shows an overall system environment illustrating an online system receiving search requests from clients and processing them, according to an embodiment.

FIG. 1A show an overall system environment illustrating an online system receiving search requests from clients and processing them, in accordance with an embodiment. As shown in FIG. 1A, the overall system environment includes an online system 100, one or more client devices 110, and a network 150. Other embodiments may use more or fewer or different systems than those illustrated in FIG. 1A. Functions of various modules and systems described herein can be implemented by other modules and/or systems than those described herein.

FIG. 1A and the other figures use like reference numerals to identify like elements. A letter after a reference numeral, such as "120A," indicates that the text refers specifically to the element having that particular reference numeral. A reference numeral in the text without a following letter, such as "120," refers to any or all of the elements in the figures bearing that reference numeral (e.g. "120" in the text refers to reference numerals "120A" and/or "120B" in the figures).

A client device 110 is used by users to interact with the online system 100. A user interacts with the online system 100 using client device 110 executing client application 120. An example of a client application 120 is a browser application. In an embodiment, the client application 120 interacts with the online system 100 using HTTP requests sent over network 150.

The online system 100 includes an object store 160 and a search module 130. The online system 100 receives search requests 140 from users via the client devices 110. The object store 160 stores data represented as objects. An object may represent a document, for example, a knowledge article, an FAQ (frequently asked question) document, a manual for a product, and so on. An object may also represent an entity associated with an enterprise, for example, an entity of entity type opportunity, case, account, and so on. An entity may also be referred to as a record or a tuple comprising a set of values. In general, search results comprise objects that may be documents or entities. Accordingly, search results for a search query may include documents, entities, or a combination of both.

A search request 140 specifies search criteria, for example, a search query comprising search terms/keywords, logical operators specifying relations between the search terms, details about facets to retrieve, additional filters like size, scope, ordering, and so on. A search query may comprise a search keyword that identifies a user. For example, the search query "Jack compliance" includes a keyword Jack that may identify one or more users. In an embodiment, the search request is for results that match the remaining keywords of the search query excluding the keyword that identifies the target user, for example, search keyword "compliance". In other embodiment, the search request is for results that match all the keywords of the search query including the keyword Jack.

The search module 130 processes the search requests 140 and determines search results comprising documents/entities that match the search criteria specified in the search request 140. The search module 130 ranks the search results based on a measure of likelihood that the user is interested in each search result. The search module 130 sends the ranked search results to the client device 110. The client device 110 presents the search results based on the ranking, for example, in descending order with higher ranked search results occupying a higher position in the order.

The search module 130 uses features extracted from search results to rank the search results. In an embodiment, the search module 130 determines a relevance score for each search result based on a weighted aggregate of the features describing the search result. Each feature is weighted based on a feature weight associated with the feature. The search module 130 adjusts the feature weights to improve the ranking of search results.

In an embodiment, the search module 130 modifies the feature weights and measures the impact of the modification by applying the new feature weights to past search requests and analyzing the newly ranked results. The online system stores information describing past search requests. The stored information comprises, for each stored search request, the search request and the set of search results returned in response to the search request.

The online system 100 monitors which results were of interest to the user based on user interactions responsive to the user being presented with the search results. Accordingly, if the online system receives a data access request for a given search result, the online system 100 marks the given search result as an accessed search result. In an embodiment, the online system collects statistical information describing the entity types corresponding to the search results that the users accessed. The online system 100 determine based on the statistical information a measure of likelihood of a user accessing an entity or record of a particular entity type responsive to being presented with a set of search results of various entity types. The online system 100 determines an aggregate measure of a likelihood of a user belonging to a cluster of users accessing entities of a particular entity type.

The search module 130 adjusts the feature weights to measure if the ranks of the accessed search results improve. Accordingly, the search module 130 may try a plurality of different feature weight combinations to find a particular feature weight combination that results in the optimal ranking of accessed search results. The search module 130 determines that a ranking based on a first set of feature weights is better than a ranking based on a second set of feature weights if the accessed results are ranked higher on average based on the first set of feature weights compared to the second set of feature weights.

In some embodiments, an online system 100 stores information of one or more tenants to form a multi-tenant system. Each tenant may be an enterprise as described herein. As an example, one tenant might be a company that employs a sales team where each salesperson uses a client device 110 to manage their sales process. Thus, a user might maintain contact data, leads data, customer follow-up data, performance data, goals, and progress data, etc., all applicable to that user's personal sales process.

In one embodiment, online system 100 implements a web-based customer relationship management (CRM) system. For example, in one embodiment, the online system 100 includes application servers configured to implement and execute CRM software applications as well as provide related data, code, forms, webpages and other information to and from client devices 110 and to store to, and retrieve from, a database system related data.

With a multi-tenant system, data for multiple tenants may be stored in the same physical database, however, tenant data typically is arranged so that data of one tenant is kept logically separate from that of other tenants so that one tenant does not have access to another tenant's data, unless such data is expressly shared. In certain embodiments, the online system 100 implements applications other than, or in addition to, a CRM application. For example, the online system 100 may provide tenant access to multiple hosted (standard and custom) applications, including a CRM application. According to one embodiment, the online system 100 is configured to provide webpages, forms, applications, data and media content to client devices 110. The online system 100 provides security mechanisms to keep each tenant's data separate unless the data is shared.

A multi-tenant system may implement security protocols and access controls that keep data, applications, and application use separate for different tenants. In addition to user-specific data and tenant-specific data, the online system 100 may maintain system level data usable by multiple tenants or other data. Such system level data may include industry reports, news, postings, and the like that are sharable among tenants.

It is transparent to customers that their data may be stored in a database that is shared with other customers. A database table may store rows for a plurality of customers. Accordingly, in a multi-tenant system, various elements of hardware and software of the system may be shared by one or more customers. For example, the online system 100 may execute an application server that simultaneously processes requests for a number of customers.

In an embodiment, the online system 100 optimizes the set of features weights for each tenant of a multi-tenant system. This is because each tenant may have a different usage pattern for the search results. Accordingly, search results that are relevant for a first tenant may not be very relevant for a second tenant. Therefore, the online system determines a first set of feature weights for the first tenant and a second set of feature weights for the second tenant.

The online system 100 and client devices 110 shown in FIG. 1A can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, etc. The online system 100 stores the software modules storing instructions, for example search module 130.

The interactions between the client devices 110 and the online system 100 are typically performed via a network 150, for example, via the Internet. In one embodiment, the network uses standard communications technologies and/or protocols. In another embodiment, various devices, and systems can use custom and/or dedicated data communications technologies instead of, or in addition to, the ones described above. The techniques disclosed herein can be used with any type of communication technology, so long as the communication technology supports receiving by the online system 100 of requests from a sender, for example, a client device 110 and transmitting of results obtained by processing the request to the sender.

Figure 1B:
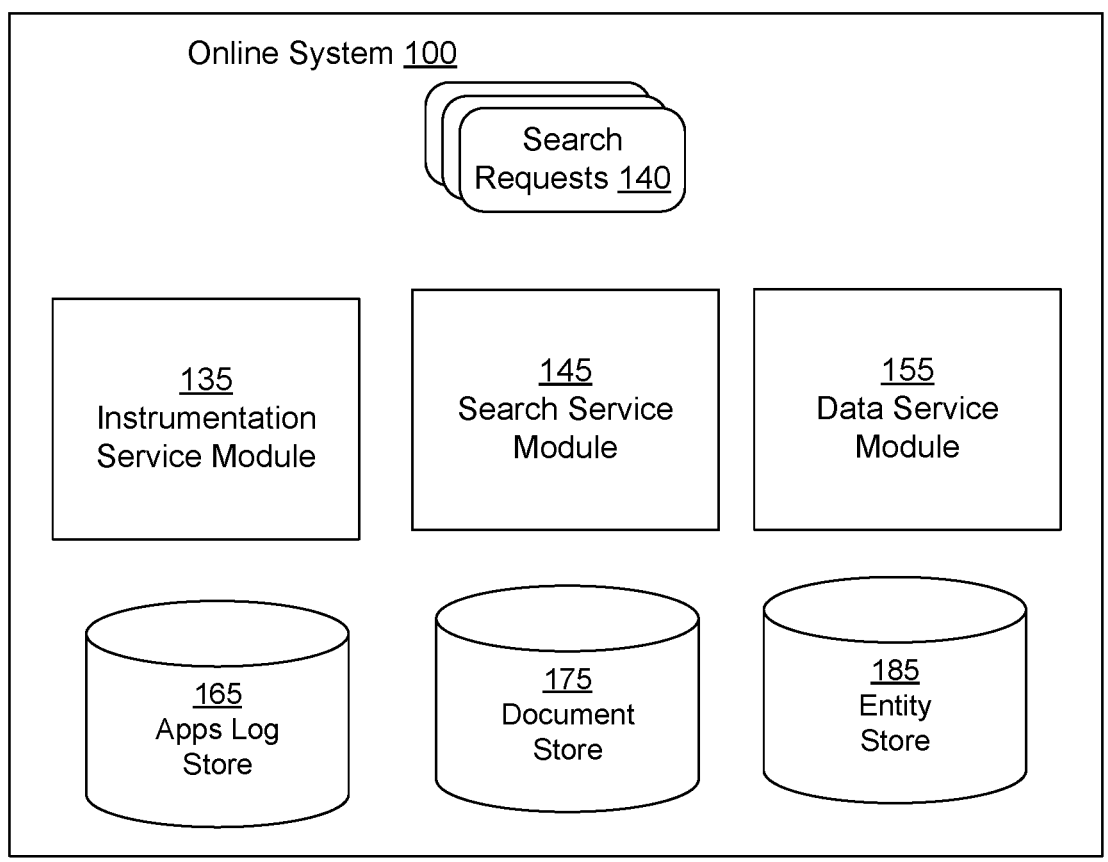
FIG. 1B show an overall system environment illustrating an online system receiving search requests from clients and processing them, according to another embodiment.

FIG. 1B show an overall system environment illustrating an online system receiving search requests from clients and processing them, in accordance with another embodiment. As shown in FIG. 1B, the online system includes an instrumentation service module 135, a search service module 145, a data service module 155, an apps log store 165, a document store 175, and an entity store 185. The functionality of modules shown in FIG. 1B may overlap with the functionality of modules shown in FIG. 1A.

The online system 100 receives search requests 140 having different search criteria from clients. The search service module 145 executes searches and returns the most relevant results matching search criteria received in the search query.

The instrumentation service module 135 is a logging and monitoring module that receives logging events from different clients. The instrumentation service module 135 validates these events against pre-defined schemas. The instrumentation service module 135 may also enrich events with additional metadata like user id, session id, etc. Finally, the instrumentation service module 135 publishes these events as log lines to the app logs store 165.

The data service module 155 handles operations such as document and entity create, view, save and delete. It may also provide advanced features such as caching and offline support.

The apps log store 165 stores various types of application logs. Application logs may include logs for both client applications as well different modules of the online system itself.

The entity store 185 stores details of entities supported by an enterprise. Each entity is associated with an entity type. Accordingly, an entity is an instance of a particular entity type. For example, a particular contact having id=123, first name="Joe", last name="Smith, phone=555-1234, and so on represents a particular entity of entity type contact. Entities may represent an individual account, which is an organization or person involved with a particular business (such as customers, competitors, and partners). It may represent a contact, which represents information describing an individual associated with an account. It may represent a customer case that tracks a customer issue or problem, a document, a calendar event, and so on.

Each entity has a well-defined schema describing its fields. For example, an account may have an id, name, number, industry type, billing address etc. A contact may have an id, first name, last name, phone, email etc. A case may have a number, account id, status (open, in-progress, closed) etc. Entities might be associated with each other. For example, a contact may have a reference to account id. A case might include references to account id as well as contact id.

The document store 175 stores one or more documents of supported entity types. It could be implemented as a traditional relational database or NoSQL database that can store both structured and unstructured documents.

System Architecture

Figure 2A:
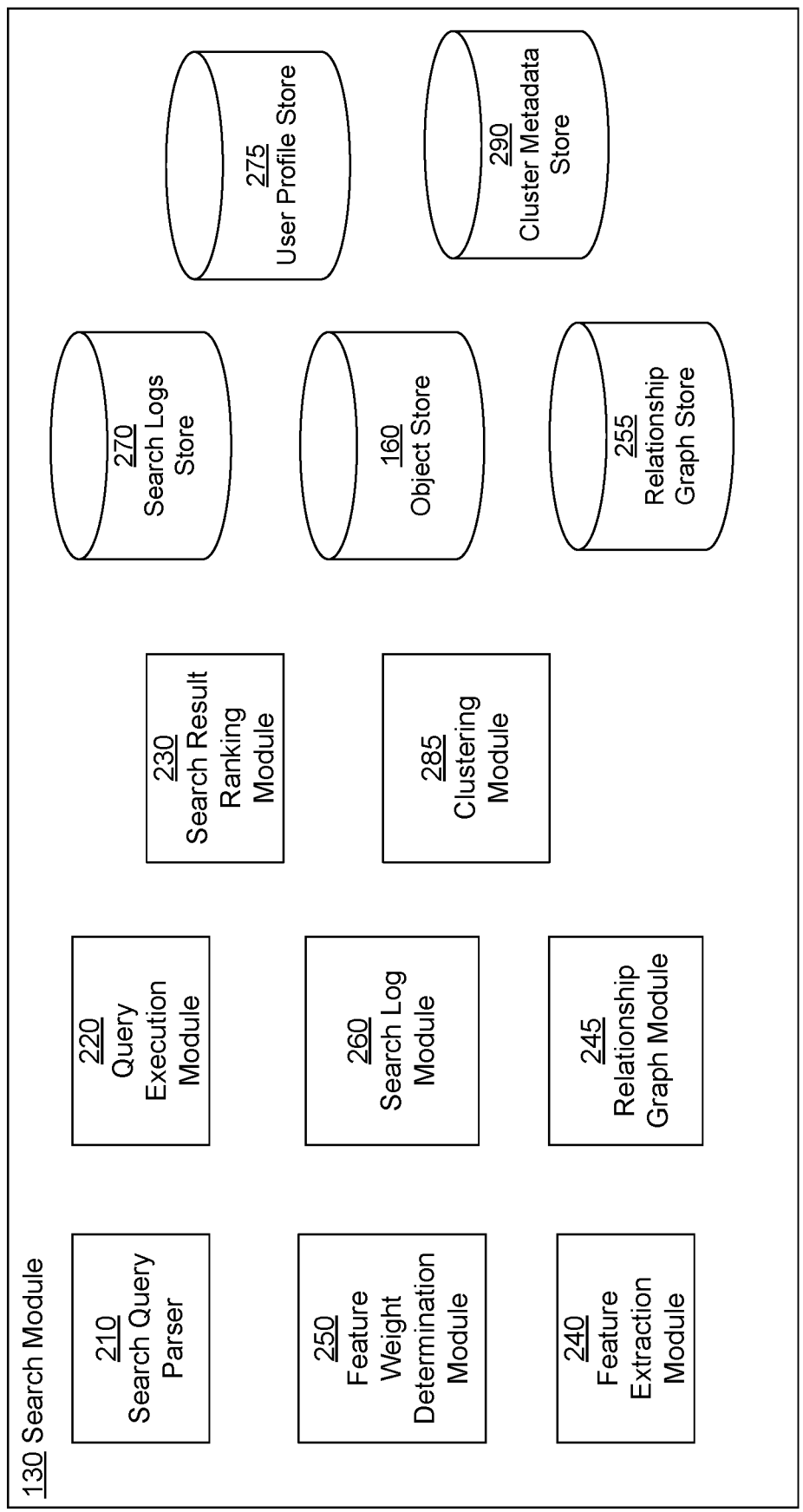
FIG. 2A shows the system architecture of a search module, according to an embodiment.

FIG. 2A shows the system architecture of a search module, in accordance with an embodiment. The search module 130 comprises a search query parser 210, a query execution module 220, a search result ranking module 230, a relationship graph module 245, a search log module 260, a feature extraction module 240, a feature weight determination module 250, a user profile store 275, a clustering module 285, a search logs store 270, a relationship graph store 255, and the object store 160. Other embodiments may include more or fewer modules. Functionality indicated herein as being performed by a particular module may be performed by other modules.

The object store 160 stores entities associated with an enterprise. The object store 160 may also store documents, for example, knowledge articles, FAQs, manuals, and so on. An enterprise may be an organization, a business, a company, a club, or a social group. An entity has an entity type, for example, account, a contact, a lead, an opportunity, and so on. The term "entity" may also be used interchangeably herein with "object".

An entity may represent an account representing a business partner or potential business partner (e.g. a client, vendor, distributor, etc.) of a user, and may include attributes describing a company, subsidiaries, or contacts at the company. As another example, an entity may represent a project that a user is working on, such as an opportunity (e.g. a possible sale) with an existing partner, or a project that the user is trying to get. An entity may represent an account representing a user or another entity associated with the enterprise. For example, an account may represent a customer of the first enterprise. An entity may represent a user of the online system.

In an embodiment, the object store 160 stores an object as one or more records. An object has data fields that are defined by the structure of the object (e.g. fields of certain data types and purposes). For example, an object representing an entity may store information describing the potential customer, a status of the opportunity indicating a stage of interaction with the customer, and so on. An object representing an entity of entity type case may include attributes such as a date of interaction, information identifying the user initiating the interaction, description of the interaction, and status of the interaction indicating whether the case is newly opened, resolved, or in progress.

The object store 160 may be implemented as a relational database storing one or more tables. Each table contains one or more data categories logically arranged as columns or fields. Each row or record of a table contains an instance of data for each category defined by the fields. For example, an object store 160 may include a table that describes a customer with fields for basic contact information such as name, address, phone number, fax number, etc. Another table might describe a purchase order, including fields for information such as customer, product, sale price, date, etc.

The search query parser 210 parses various components of a search query. The search query parser 210 checks if the search query conforms to a predefined syntax. The search query parser builds a data structure representing information specified in the search query. For example, the search query parser 210 may build a parse tree structure based on the syntax of the search query. The data structure provides access to various components of the search query to other modules of the online system 100.

The query execution module 220 executes the search query to determine the search results based on the search query. The search results determined represent the objects stored in the object store 160 that satisfy the search criteria specified in the search query. In some embodiments, the query execution module 220 develops a query plan for executing a search query. The query execution module 220 executes the query plan to determine the search results that satisfy the search criteria specified in the search query. As an example, a search query may request all entities of a particular entity type that include certain search terms, for example, all entities representing cases that contain certain search terms. The query execution module 220 identifies entities of the specified entity type that include the search terms as specified in the search criteria of the search query. The query execution module 220 provides a set of identified entities, to the feature extraction module 240.

The feature extraction module 240 extracts features of the entities from the identified set of entities and provides the extracted features to the feature weight determination module 250. In an embodiment, the feature extraction module 240 represents a feature using a name and a value. The features describing the entities may depend on the entity type. Some features may be independent of the entity type and apply to all entity types. Examples of features extracted by the feature extraction module 240 include a time of the last modification of an entity or the age of the last modification of the entity determined based of the length of time interval between the present time and the last time of modification.

The feature extraction module 240 extracts entity type specific features from certain entities. For example, if an entity represents an opportunity or a potential transaction, the feature extraction module 240 extracts a feature indicating whether an entity representing an opportunity is closed or a feature indicating an estimate of time when the opportunity is expected to close. As another example, if an entity represents a case, feature extraction module 240 extracts features describing the status of the case, status of the case indicating whether the case is a closed case, an open case, an escalated case, and so on. In an embodiment, a feature associated with an entity of a particular entity type is a weight associated with the entity type. The weight may be determined for each cluster of users. The weight of an entity type indicates the likelihood of the user interacting with the search result of that entity type.

The feature weight determination module 250 determines weights for features and assigns scores for features of search results by the query execution module 220. Different features have different contribution to the overall measure of relevance of the search result. The differences in relevance among features of a search result with regards to a search request 140 are represented as weights. Each feature of each determined search result is scored according to its relevance to search criteria of the search request, then those scores are weighted and combined to create a relevance score for each search result. In an embodiment, the feature weights are determined for each user cluster and stored as metadata for that user cluster. Accordingly, the weights for a user cluster C1 may be different from the weights for a user cluster C2. The online system ranks the search result for a search query received from a user based on the feature weights of the cluster of users matching the user.

Feature weights may be determined by analysis of search result performance and training models. This can be done using machine learning. Dimensionality reduction (e.g., via linear discriminant analysis, principle component analysis, etc.) may be used to reduce Machine learning algorithms used include support vector machines (SVMs), boosting for other algorithms (e.g., AdaBoost), neural net, logistic regression, naive Bayes, memory-based learning, random forests, bagged trees, decision trees, boosted trees, boosted stumps, etc. In an embodiment, the online system trains a machine learning for each cluster of users and uses the machine learning model for a user providing the search query for ranking the search results matching that search query.

Random forest classification based on predictions from a set of decision trees may be used to train a model. Each decision tree splits the source set into subsets based on an attribute value test. This process is repeated in a recursive fashion. A decision tree represents a flow chart, where each internal node represents a test on an attribute. For example, if the value of an attribute is less than or equal to a threshold value, the control flow transfers to a first branch and if the value of the attribute is greater than the threshold value, the control flow transfers to a second branch. Each branch represents the outcome of a test. Each leaf node represents a class label, i.e., a result of a classification.

Each decision tree uses a subset of the total predictor variables to vote for the most likely class for each observation. The final random forest score is based on the fraction of models voting for each class. A model may perform a class prediction by comparing the random forest score with a threshold value. In some embodiments, the random forest output is calibrated to reflect the probability associated with each class.

The weights of features for predicting relevance of different search requests with different sets of search criteria and features may be different. Accordingly, a different machine learning model may be trained for each cluster of similar users and applied to search queries received from users matching the cluster of user. In an embodiment, the information identifying the search result that was accessed by a user belonging to a cluster is provided as a labeled training dataset for training the machine learning model corresponding to that cluster of users.

A factor which impacts the weight of a feature vector, or a relevance score overall, is user interaction with the corresponding search result. If a user selects one or more search results for further interaction, those search results are deemed relevant to the search request, and therefore the system records those interactions and uses those stored records to improve search result ranking for the subsequent search requests.

The search result ranking module 230 ranks search results determined by the query execution module 220 for a given search query. For example, the online system may perform this by applying a ranking model stored for a cluster of users, to the features of each search result and thereafter sorting the search results in descending order of relevance score. Factors such as search result interaction, also impact the ranking of each search result. Search results which have been interacted with for a given search request are ranked higher than other search results for similar search requests.

In one embodiment, entity type is one of the features used for determining relevance of search results for ranking them. For a cluster of users, the online system determines, for each entity type that may be returned as a search result, a weight based on an aggregate number of user interactions with search results of that entity type. Accordingly, the online system weighs search results of certain entity types as more relevant than search results of other entity types for that cluster of users. Accordingly, when the online system receives a search request, the online system ranks the search results with entity types rated more relevant higher than search results with entity types rated less relevant.

The search log module 260 stores information describing search requests, also known as search queries, processed by the online system 100 in search logs store 270. The search log module 260 stores the search query received by the online system 100 as well as information describing the search results identified in response to the search query. The search log module 260 also stores information identifying accessed search results. An accessed search result represents a search result for which the online system receives a request for additional information responsive to providing the search results to a requestor. For example, the search results may be presented to the user via the client device 110 such that each search result displays a link providing access to the entity represented by the search result. Accordingly, a result is an accessed result if the user clicks on the link presented with the result.

In an embodiment, the search logs store 270 stores the information in a file, for example, as a tuple comprising values separated by a separator token such as a comma. In another embodiment, the search logs store 270 is a relational database that stores information describing searches as tables or relations.

The user profile store 275 stores user profile information for users of the online system 100. The user profile information may be represented as user profile attributes. A user profile attribute represents a role of the user in an organization. The organization may be associated with a hierarchy of roles. Examples of roles include a manager, an individual contributor, an executive, a technical support person, a customer service representative, and so on. A user profile attribute stores information describing the entity types that are commonly accessed by the user. For example, the user profile attribute may store a score for each entity type, the score indicating a likelihood of the user accessing a record of that entity type responsive to being presented with records of different entity types, for example, as search results. The score may be determined based on statistical information collected from past search queries provided by the user and the entity types of search results that the user accessed. The score may be determined based on the entity types that the user accesses during interactions with the online system. For example, a sales representative may access records of entity type "opportunity" more frequently compared to a human resources person who accesses records of "employee information" more frequently. Other user profile attributes include age, gender, salary range, location, and languages spoken.

The clustering module 285 performs clustering of user profiles based on feature vectors describing the user profile, referred to as user feature vectors. In an embodiment, the user feature vectors represent the user profile attributes such that each feature of the user feature vector stores a value determined from a particular user profile attribute. In another embodiment, the user feature vector is extracted from a neural network that is configured to receive an encoding of the user profile attributes. The user feature vector is extracted as an embedding representing an output of a hidden layer of the neural network. The clustering module performs clustering to determine clusters of uses that have similar user profiles. In an embodiment, the clustering module executes a k-means clustering algorithm for clustering the user feature vectors. Other embodiments may execute other clustering algorithms. In an embodiment, the clustering module 285 treats each feature of the feature vector as a dimension. Accordingly, the clustering module 285 represents each feature vector as a data point in a multi-dimensional space of a plurality of dimensions, each dimension corresponding to a feature. The distance between two data points in the multi-dimensional space provides a measure of similarity between two feature vectors corresponding to the two data points. Accordingly, two data points that are close to each other represent more similar feature vectors compared to two data points that are further apart. Accordingly, a measure of similarity between two data points is inversely related to the distance between the two data points.

The clustering module 285 identifies clusters of feature vector such that feature vectors belonging to a cluster are closer to each other as compared to feature vectors outside the cluster. The clustering module 285 can use various clustering techniques, for example, centroid-based clustering (e.g., k-means clustering), distribution-based clustering, density-based clustering (e.g., mean-shift clustering), and so on. The clustering module 285 stores information describing the clusters in the cluster metadata store 290. Information describing a cluster includes a cluster identifier and statistical information describing aggregate feature vectors for the cluster. The cluster metadata store 290 stores a set of weights corresponding to each cluster of users. The set of weights is used for ranking search results in a manner that is specific to each cluster of users.

In an embodiment, a user profile stored in the user profile store 275 is represents a group of users, for example, a team of users working on a project, a set of employees belonging to a group defined by the organization hierarchy tree, and so on. A set of employees may be determined to belong to a group if they all report to a same user, for example, if they report to a manager, as defined by the organization hierarchy tree. Accordingly, the clustering module 285 may determine a cluster to be a set of users based on the organization hierarchy tree, for example, a group of users reporting to the same user as defined by the organization hierarchy tree, or a set of users determined to be collaborating on a project of an enterprise. A user profile may represent an organization or an enterprise, for example, an enterprise representing a potential customer of a user representing a sales person.

The relationship graph store 255 stores a relationship graph specifying relationships between various users, for example, various users associated with an enterprise. The relationship graph comprises nodes and edges, wherein a node represents a user or a set of users. In an embodiment, a node is associated with a user profile stored in the user profile store 275. Accordingly, if the user profile represents a user, the node corresponds to that user. Similarly, if the user profile represents a set of users, the node corresponds to that set of users. An edge from a node N1 to a node N2 represents a relationship between users N1 and N2.

In an embodiment, edges of the relationship graph are unidirectional. Accordingly, an edge is from a source node to a target node. In some embodiments, edges may be bidirectional. A bidirectional edge between nodes N1 and N2 may be represented by a pair of unidirectional edges, i.e., an edge E1 going from node N1 to N2 and an edge E2 going from node N2 to node N1. Each node is associated with a user profile (or a user account) that represents one or more users. The relationship graph store 255 stores a relationship type for each relationship.

In an embodiment, the relationship graph store 255 is implemented as one or more tables (or relations) in a relational database. For example, the relational database may store a NODE table comprising records describing nodes and an EDGE table storing edges between nodes. The NODE table comprises records representing nodes and has a primary key that identifies each record. The EDGE table comprises edges represented as pairs of foreign keys, each pair comprising a first foreign key identifying a source node and a second foreign key identifying a target node. The EDGE table further stores information describing the edge, for example, one or more relationship types, a relationship strength score, and a timestamp indicating when the record was last updated. Given an information identifying a source node and a target node, the online system 100 builds a database query to access information describing the edge between the source node and the target node.

The relationship graph module 245 determines the relationship type of a relationship based on attributes of nodes connected by the relationship. In an embodiment, the online system 100 uses a set of predefined relationship types and selects one of the predefined relationship type for a given relationship. Following are examples of relationship types for a relationship represented by an edge from a source node to a target node, wherein the source node represents a source user and the target node represents a target user. One example of a relationship type is a supervisor/supervisee relationship type, if the relationship graph module 245 determines the source user to be a supervisor of the target user according to an organization hierarchy tree of an organization, wherein the source user and the target user belong to the organization. Another example of a relationship type is a colleague relationship type if the relationship graph module 245 determines that source user and the target user belong to the same group within an organization hierarchy represented by the organization hierarchy tree. Another example of a relationship type is a collaborator relationship type, if the relationship graph module 245 determines that the source user and the target users communicate with each other at a rate exceeding a threshold value. The target user and the source user may communicate using client devices, for example, via email, messenger, and so on. A relationship type may be defined based on a group of the source user and a group of the target user within an organization, for example, a developer/tester relationship type. Another example of a relationship type is a sales person/client relationship type if the relationship graph module 245 determines that the source user is a sales person of an organization and the target user represents a client or a potential client of the sales person. In this example, the target user may be an organization, for example, a company.

The relationship graph module 245 populates the data of the relationship graph by adding nodes and edges to it and updating values associated with the nodes and edges, for example, a relationship type of each relationship. The relationship graph module 245 also determines a relationship strength score of an edge. The relationship strength score provides a indication of how strong the relationship of a particular relationship type is. The online system 100 uses the relationship strength score for ranking search results for users. Accordingly results associated with a high relationship strength score are likely to be ranked higher than results associated with low relationship strength score. The relationship graph module 245 may update the relationship type and relationship strength score of the edge repeatedly.

In an embodiment, the relationship graph module 245 uses different mechanisms for determining relationship strength score for different relationship types. Accordingly, the relationship graph module 245 may determine relationship strength score for relationship type T1 using a different mechanism than relationship strength score for relationship type T2. In an embodiment, the relationship graph module 245 stores a set of instructions for each relationship type for determining relationship strength score for that relationship type. The set of instructions may represent a function or a method. The relationship graph module 245 invokes the set of instructions corresponding to the relationship type for a relationship to determine the relationship strength score for that relationship.

In an embodiment, the online system 100 determines a measure of distance between the source user and the target user within an organization hierarchy tree. The online system 100 determines the relationship strength score for the relationship between the source user and the target user based on the measure of distance. For example, the set of instructions corresponding to relationship type supervisor/supervisee determines relationship strength score based on a number of nodes (or edges) that need to be traversed from the source node to the target node. More specifically, relationship strength score is inversely related to a number of nodes (or edges) that need to be traversed from the source node to the target node. For example, assume that a source node N1 and a target node N2 are directly connected and the number of nodes traversed to reach from the source node to the target node is zero (alternatively the number of edges traversed is one). As another example, assume that a source node N3 and a target node N4 are indirectly connected via a node N5 and the number of nodes traversed to reach from the source node N3 to the target node N4 is one (alternatively the number of edges traversed is two). In these example, the relationship strength score of the relationship between nodes N1 and N2 is determined to be higher than the relationship strength score of the relationship between nodes N3 and N4 since the number of nodes (or edges) that need to be traversed to reach N2 from N1 is lower than the number of nodes (or edges) that need to be traversed to reach N4 from N3.

The set of instructions corresponding to a collaborator relationship type between two users determines relationship strength scores based on a rate of user interactions between the users corresponding to the two nodes. Accordingly, the relationship strength score between two users is directly proportionate to the rate of interactions between the users. This is so, because users that interact more frequently are determined to be stronger collaborators than users that interact rarely or less frequently.

The set of instructions corresponding to a relationship type sales person/potential client between two users determines relationship strength scores based on a measure of recency of the last interaction between users. Accordingly, relationship strength score between users having a sales person/potential client relationship type is inversely proportionate to a measure of age of the last interaction between the users. A recent interaction between the users indicates a higher strength score. The recent interaction may represent a communication indicating that the sales person reached out to the potential client.

Accordingly, the rate of interactions required to achieve the same relationship strength scores may depend on the relationship type. The rate of interactions between users having a supervisor/supervisee relationship type may be much less than the rate of interactions between users having a collaborator relationship type to achieve the same relationship strength score.

In an embodiment, the online system 100 determines an expected rate of interactions for each relationship type. The expected rate of interactions may be provided by an expert user. Alternatively, the expected rate of interactions is determined by monitoring users having relationships of that relationship type over time. The relationship strength score depends on a comparison of actual interaction rate between users having a particular relationship type with the expected rate of interactions for that relationship type. For example, supervisor/supervisee relationship type may have a low expected interaction rate compared to relationship type colleagues or collaborator.

In an embodiment, the online system 100 determines a normalized relationship strength score so that the relationship strength scores can be compared across different relationship types. The online system 100 determines a normalized relationship strength score by dividing the actual rate of interaction between two users having a relationship type with the expected rate of interaction for that relationship type.

In an embodiment, the relationship graph module 245 module adds nodes and edges to the relationship graph as needed. For example, if a user (referred to as a source user) creates a session with the online system 100 and performs a search using the session, the relationship graph module 245 determines whether the relationship graph store 255 has a node representing the source user. If the relationship graph store 255 does not have a node representing the source user, the relationship graph module 245 adds a source node representing the source user to the relationship graph. Similarly, if the online system receives a search query comprising a search keyword that identifies a user (represented as a target user), the relationship graph module 245 determines whether the relationship graph store 255 has a node representing the target user. If the relationship graph store 255 does not have a node representing the target user, the relationship graph module 245 adds a target node representing the target user to the relationship graph. Furthermore, the relationship graph module 245 determines whether the relationship graph store 255 has an edge from the source node to the target node, for example, if both source node and target node previously existed in the relationship graph. If the relationship graph module 245 determines that the relationship graph does not have an edge from the source node to the target node, the relationship graph module 245 adds an edge from the source node to the target node to the relationship graph.

In an embodiment, the relationship graph module 245 maintains a precedence order between relationship types. Accordingly, if an edge is associated with two possible relationship types, the relationship graph module 245 selects the relationship type having the highest precedence and assigns the selected relationship type to the edge. For example, a supervisor/supervisee relationship type may rank higher than a collaborator relationship type according to the precedence. Accordingly, if two users can have both relationship types: a collaborator relationship type and a supervisor/supervisee relationship type, the relationship graph module 245 assigns the supervisor/supervisee relationship type to the edge based on the precedence rules.

In an embodiment, the relationship graph store 255 stores multiple relationship types for an edge. Accordingly, in the above example, the relationship graph store 255 stores both supervisor/supervisee relationship type and the collaborator relationship type for the edge. Accordingly, the relationship graph module 245 determines the relationship strength score for a relationship as an aggregate of relationship strength scores determined for each of a plurality of relationship types associated with the relationship.

In an embodiment, the online system determines the relationship strength score for the relationship between the source user and the target user by determining a weighted combination of factors including: a measure of distance between the source user and the target user within an organization hierarchy tree; an age of a last interaction between the source user and the target user; and a rate of interaction between the source user and the target user. The weights corresponding to each factor may be received from an expert user and then incrementally modified to improve the quality of ranking of search results. The quality ranking of search results is measured based on feedback from users, for example, by monitoring the result that a user interacts with responsive to being presented with a set of results ranked in a particular order.

The relationship graph module 245 may periodically update the relationship strength score of an edge representing a relationship. In an embodiment, the relationship graph module 245 may update the relationship type of a relationship represented by an edge if there are changes in the attributes of the nodes connected by the edge, for example, a change in the organization hierarchy tree may cause an edge of relationship type collaborator to be modified to an edge of relationship type supervisor/supervisee.

Figure 2B:
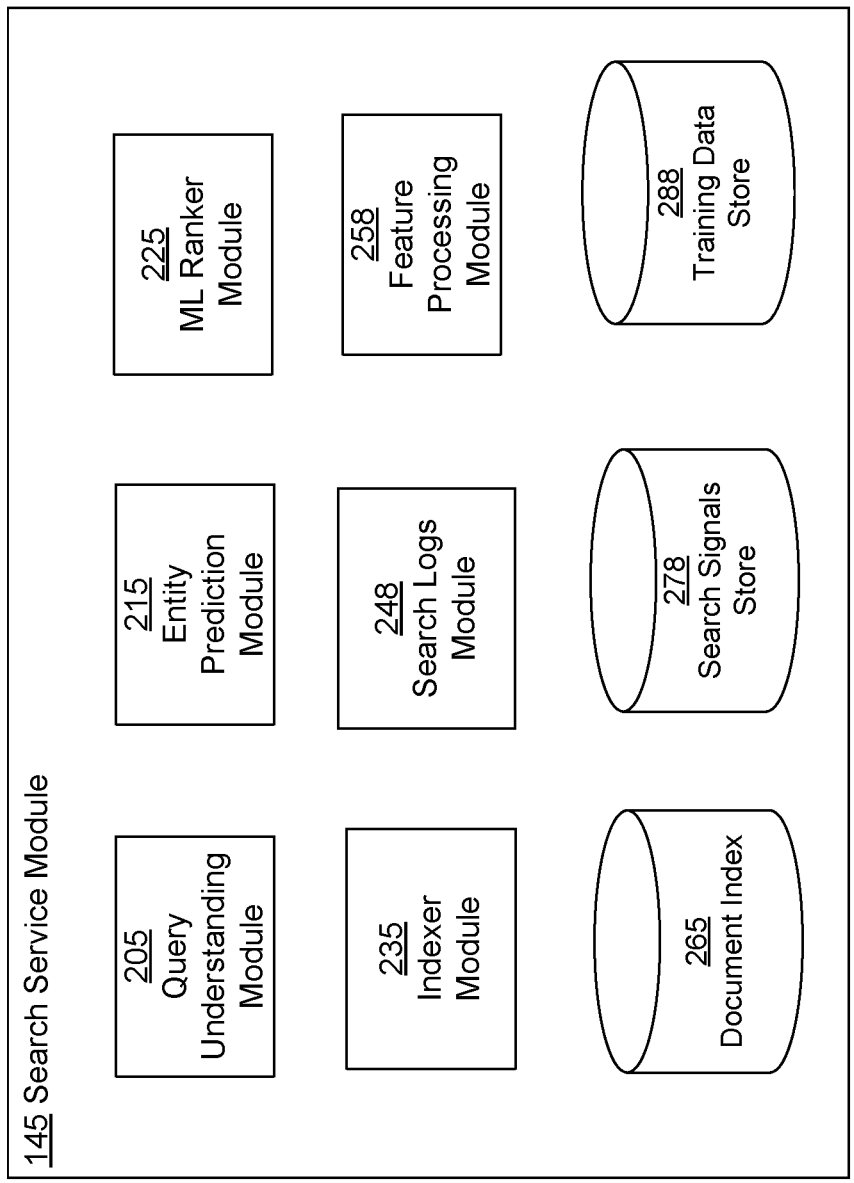
FIG. 2B shows the system architecture of a search service module, according to another embodiment.

FIG. 2B shows the system architecture of a search service module 145, in accordance with another embodiment. The search service module 145 includes a query understanding module 205, an entity prediction module 215, a machine learning (ML) ranker module 225, an indexer module 235, a search logs module 248, a feature processing module 258, a document index 265, a search signals store 278, and a training data store 288. Other embodiments may include other modules in the search service module 145.

The query understanding module 205 determines what the user is searching for, i.e., the precise intent of the search query. It corrects an ill-formed query. It refines queries by applying techniques such as spell correction, reformulation and expansion. Reformulation includes application of alternative words or phrases to the query. Expansion includes sending more synonyms of the words. It may also send morphological words by stemming.

Furthermore, the query understanding module 205 performs query classification and semantic tagging. Query classification represents classifying a given query in a predefined intent class (also referred to herein as a cluster of similar queries.). For example, the query understanding module 205 may classify "curry warriors san francisco" as a sports related query.

Semantic tagging represents identifying the semantic concepts of a word or phrase. The query understanding module 205 may determine that in the example query, "curry" represents a person's name, "warriors" represents a sports team name, and "san francisco" represents a location.

The entity prediction module 215 predicts which entity the user is most likely to access from the search results of a search query. In some embodiments, the entity prediction module 215 may be merged into query understanding module.

Entity prediction is based on machine learning (ML) algorithm which computes probability score for each entity for given query. This ML algorithm generates a model based on a set of features. This model is trained offline using training data stored in training data store 288.

The features used by the ML model can be broadly divided into following categories: (1) Query level features or search query features: These features depend only on the query. While training, the entity prediction module 215 builds an association matrix of queries to identify similar set of queries. It extracts click and hover information from these historical queries. This information serves as a primary distinguishing feature.

The ML ranker module 225 is a machine-learned ranker module. Learning to rank or machine-learned ranking (MLR) is the application of machine learning in the construction of ranking models for information retrieval systems.

There are several standard retrieval models such as TF/IDF and BM25 that are fast enough to be produce reasonable results. However, these methods can only make use of very limited number of features. In contrast, MLR system can incorporate hundreds of arbitrarily defined features.

Users expect a search query to complete in a short time (such as a few hundred milliseconds), which makes it impossible to evaluate a complex ranking model on each document in a large corpus, and so a multi-phase scheme can be used.

Level-1 Ranker: top-K retrieval first, a small number of potentially relevant documents are identified using simpler retrieval models which permit fast query evaluation, such as the vector space model (TF/IDF) and BM25, or a simple linear ML model. This ranker is completely at individual document level, i.e. given a (query, document) pair, assign a relevance score.

Level-2 Ranker: In the second phase, a more accurate but computationally expensive machine-learned model is used to re-rank these documents. This is where heavy-weight ML ranking takes place. This ranker takes into consideration query classification and entity prediction external features from query understanding module and entity prediction module respectively.

The level-2 ranker may be computationally expensive due to various factors like it may depend upon certain features that are computed dynamically (between user, query, documents) or it may depend upon additional features from external system. Typically, this ranker operates on a large number of features, such that collecting/sending those features to the ranker would take time. ML Ranker is trained offline using training data. It can also be further trained and tuned with live system using online A/B testing.

The training data store 288 stores training data that typically consists of queries and lists of results. Training data may be derived from search signals store 278. Training data is used by a learning algorithm to produce a ranking model which computes relevance of results for actual queries.

The feature processing module 258 extracts features from various sources of data including user information, query related information, and so on. For ML algorithms, query-document pairs are usually represented by numerical vectors, which are called feature vectors. Components of such vectors are called features or ranking signals.

Features can be broadly divided into following categories:

(1) Query-independent or static features: These features depend only on the result document, not on the query. Such features can be precomputed in offline mode during indexing. For example, document lengths and IDF sums of document's fields, document's static quality score (or static rank), i.e. document's PageRank, page views and their variants and so on.

(2) Query-dependent or dynamic features: These features depend both on the contents of the document, the query, and the user context. For example, TF/IDF scores and BM25 score of document's fields (title, body, anchor text, URL) for a given query, connection between the user and results, and so on.

(3) Query level features or search query features: These features depend only on the query. For example, the number of words in a query, or how many times this query has been run in the last month and so on.

The feature processing module 258 includes a learning algorithm that accurately selects and stores subset of very useful features from the training data. This learning algorithm includes an objective function which measures importance of collection of features. This objective function can be optimized (maximization or minimization) depending upon the type of function. Optimization to this function is usually done by humans.

The feature processing module 258 excludes highly correlated or duplicate features. It removes irrelevant and/or redundant features that may produce discriminating outcome. Overall this module speeds up learning process of ML algorithms.

The search logs module 248 processes raw application logs from the app logs store by cleaning, joining and/or merging different log lines. These logs may include: (1) Result click logs—The document id, and the result's rank etc. (2) Query logs—The query id, the query type and other miscellaneous info. This module produces a complete snapshot of the user's search activity by joining different log lines. After processing, each search activity is stored as a tuple comprising values separated by a token such as comma. The data produced by this module can be used directly by the data scientists or machine learning pipelines for training purposes.

The search signals store 278 stores various types of signals that can be used for data analysis and training models. The indexer module 235 collects, parses, and stores document indexes to facilitate fast and accurate information retrieval.

The document index 265 stores the document index that helps optimize speed and performance in finding relevant documents for a search query. Without an index, the search engine would scan every document in the corpus, which would require considerable time and computing power. For example, while an index of 10,000 documents can be queried within milliseconds, a sequential scan of every word in 10,000 large documents could take hours.

The document index 265 may be an inverted index that helps evaluation of a search query by quickly locating documents containing the words in a query and then ranking these documents by relevance. Because the inverted index stores a list of the documents containing each word, the search engine can use direct access to find the documents associated with each word in the query in order to retrieve the matching documents quickly.

Figure 3A:
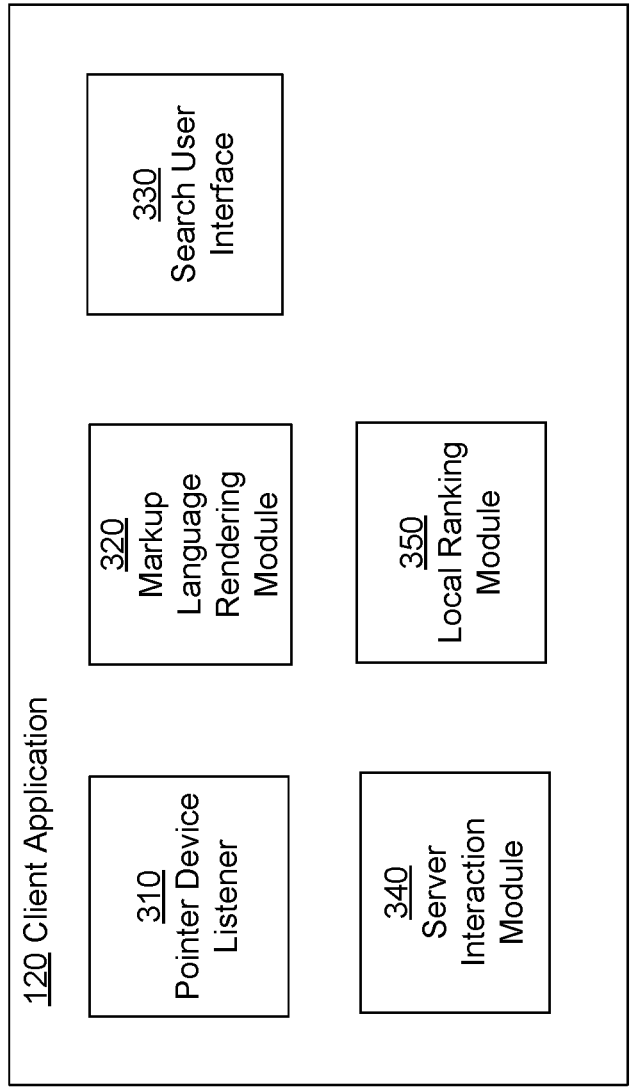
FIG. 3A shows the system architecture of a client application, according to an embodiment.

FIG. 3A shows the system architecture of a client application, in accordance with an embodiment. The client application 120 comprises a markup language rendering module 320, a search user interface 330, a server interaction module 340, and a local ranking module 350.

Data travels between the client application 120 and the online system 100 over the network 150. This is facilitated on the client application 120 side by the server interaction module 340. The server interaction module 340 connects the client application 120 to the network and establishes a connection with the online system 100. This may be done using file transfer protocol, for example, or any other computer network technology standard, or custom software and/or hardware, or any combination thereof.

The search user interface 330 allows the user to interact with the client application 120 to perform search functions. The search user interface 330 may comprise physical and/or on-screen buttons, which the user may interact with to perform various functions with the client application 120. For example, the search user interface 330 may comprise a query field wherein the user may enter a search query, as well as a results field wherein search results are displayed. In an embodiment, users may interact with search results by selecting them with a cursor.

The markup language rendering module 320 works with the server interaction module 340 and the search user interface 330 to present information to the user. The markup language rendering module 320 processes data from the server interaction module 340 and converts it into a form usable by the search user interface 330. In one embodiment, the markup language rendering module 320 works with the browser of the client application 120 to support display and functionality of the search user interface 330.

Figure 3B:
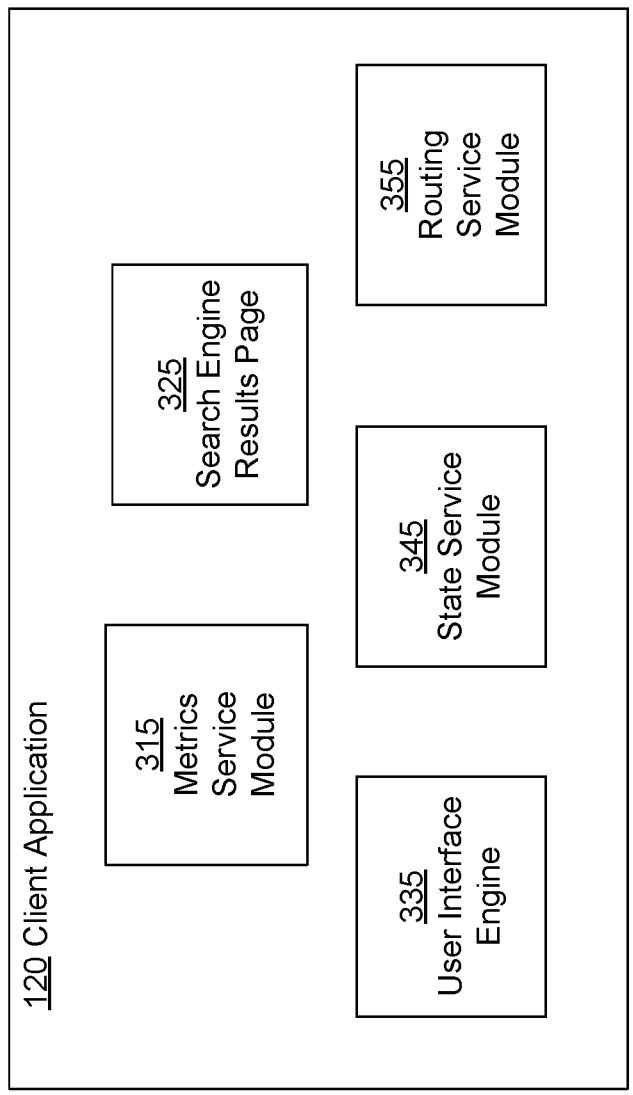
FIG. 3B shows the system architecture of a client application, according to another embodiment.

FIG. 3B shows the system architecture of a client application, in accordance with an embodiment. As shown in FIG. 3B, the client application comprises a metrics service nodule 315, a search engine results page 325, a UI (user interface) engine 335, a state service module 345, and a routing service module 355. Other embodiments may include different modules than those indicated here.

Client applications are becoming increasingly complicated. The state service module 345 manages the state of the application. This state may include responses from server side services and cached data, as well as locally created data that has not been yet sent over the wire to the server. The state may also include active actions, state of current view, pagination and so on.

The metrics service nodule 315 provides APIs for instrumenting user interactions in a modular, holistic and scalable way. It may also offer ways to measure and instrument performance of page views. It collects logging events from various views within the client application. It may batch all these requests and send it over to instrumentation service module 135 for generating the persisted log lines in app log store 165.

The UI engine 335 efficiently updates and renders views for each state of the application. It may manage multiple views, event handling, error handling and static resources. It may also manage other aspects such as localization.

The routing service module 355 manages navigation within different views of the application. It contains a map of navigation routes and associated views. It usually tries to route application to different views without reloading of the entire application.

The search engine results page 325 is used by the user to conduct searches to satisfy information needs. User interacts with the interface by issuing a search query, then reviewing the results presented on the page to determine which or if any results may satisfy user's need. The results may include documents of one or more entity types. Results are typically grouped by entities and shown in the form of sections that are ordered based upon relevance.

In one embodiment, the online system uses neural networks to extract feature vectors representing users. The various features of the feature vectors represent dimensions of a multi-dimensional space. The online system determines user clusters based on the extracted feature vectors. The online system determines a cluster matching a user by determining a feature vector corresponding to the user and then comparing it with aggregate feature vectors corresponding to the user clusters. The user cluster that corresponds to the best match between the user's feature vector and the aggregate feature vector of the user cluster represents the matching user cluster for the user.

System Processes

The processes associated with searches performed by online system 100 are described herein. The steps described herein for each process can be performed in an order different from those described herein. Furthermore, the steps may be performed by different modules than those described herein.

Figure 4:
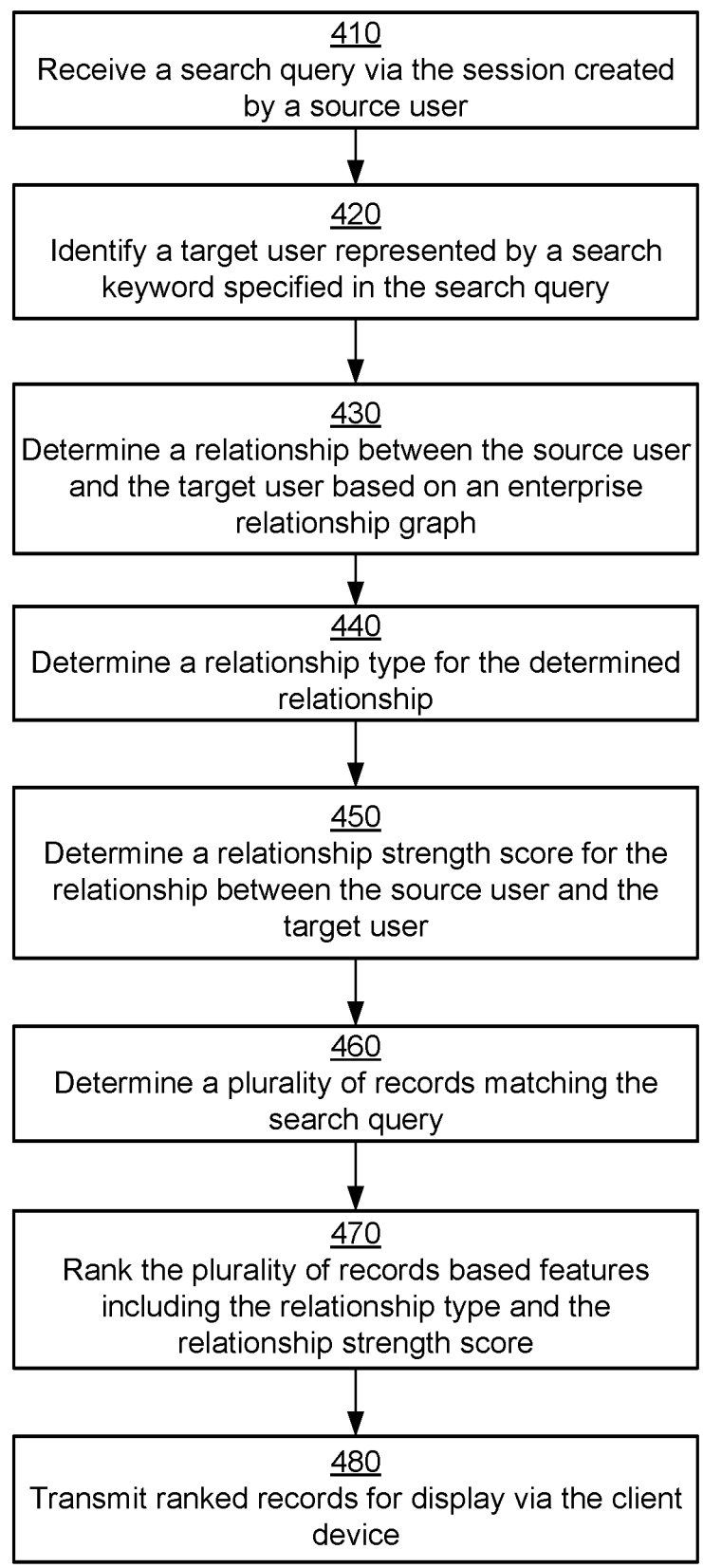
FIG. 4 illustrates a process for ranking search results based on relationship types and relationship strength scores, according to an embodiment.

FIG. 4 illustrates a process for ranking search results based on relationship types and relationship strength scores, according to an embodiment. The online system 100 receives a request to create a session from a client device. The online system 100 identifies a source user that created the session, for example, based on credentials provided by the source user for creating the session. The search module 130 receives 410 a search query via the session created by a source user. The search module 130 identifies the source user that provided the search query, for example, by identifying the user that created the session. The search query comprises a plurality of search keywords. For example, the search query may be "Joe compliance". Accordingly, the search query comprises at least one search keyword that identifies a user and one or more search keywords that represent information that does not represent a user, for example, information describing a product, an action, a particular topic, and so on.

The search module 130 performs a sematic tagging of the search keywords. The search module 130 may performs semantic tagging based on context of the query, for example, by analyzing other queries received via the session. The search module 130 may perform semantic tagging by using various types of grammars for analyzing the search query. each module 130 associates each search keyword with semantic meaning. For example, the search module 130 may determine whether a search keyword represents a verb, a proper noun, and so on. The search module determines that a particular search keyword represents a user, for example, a user associated with a user profile. The search module 130 identifies 420 a target user represented by the particular search keyword specified in the search query.

The search module 130 retrieves the user profiles of both the source user and the target user. The search module 130 determines 430 a relationship between the source user and the target user. The search module 130 determines 430 the relationship by identifying an edge between a source node representing the source user and the target node representing the target user in the enterprise relationship graph stored in the relationship graph store 255. The search module 130 determines a relationship type for the determined relationship between the source user and the target user. The search module 130 determines a relationship strength score for the relationship between the source user and the target user.

The search module 130 determines 460 a plurality of records matching the search query. The records may match all the search keywords including the search keyword that identifies the target user. For example, given the search query "Joe Compliance", the plurality of records comprise all records that include both keywords "Joe" and "compliance" or at least one of them. Alternatively, the search module 130 determines all records associated with the target user that include the remaining search keywords, i.e., the search keywords other than the search keyword that identifies the target user. For example, given the search query "Joe Compliance" the search module 130 identifies all records associated with user "Joe" that include the search keyword "compliance".

The search module 130 ranks 470 the plurality of records based on features comprising the determined relationship type and the determined relationship strength score. The search module 130 transmits 480 either all or a subset of the plurality of ranked records for display via the client device.

In an embodiment, the search module 130 accesses a set of weights for ranking the plurality of records. The each module 130 determines the set of weights based on features comprising the determined relationship type and the determined relationship strength score. The search module 130 ranks the plurality of records based on the set of weights.

In an embodiment, the set of weights comprise weights representing relevance scores for entity types. The relevance score for a particular entity type is indicative of a likelihood of a particular user interacting with a particular record of the particular entity type. Accordingly, the ranked records comprise the records of entity types that the source user is most likely to interact with.

In an embodiment, the search module 130 ranks 470 the plurality of records using a machine learning based model that takes at least one of the relationship type and the relationship strength score as input features and generates a score for ranking the records. In an embodiment, each record has an entity type and the search module 130 determines a weight for each entity type based on the relationship type and the relationship strength score. The search module 130 ranks the records based on the weights of the entity types. Alternatively, the search module selects a particular entity type based on the determined weights for the entity types and presents records of that entity type to the source user.

Figure 5:
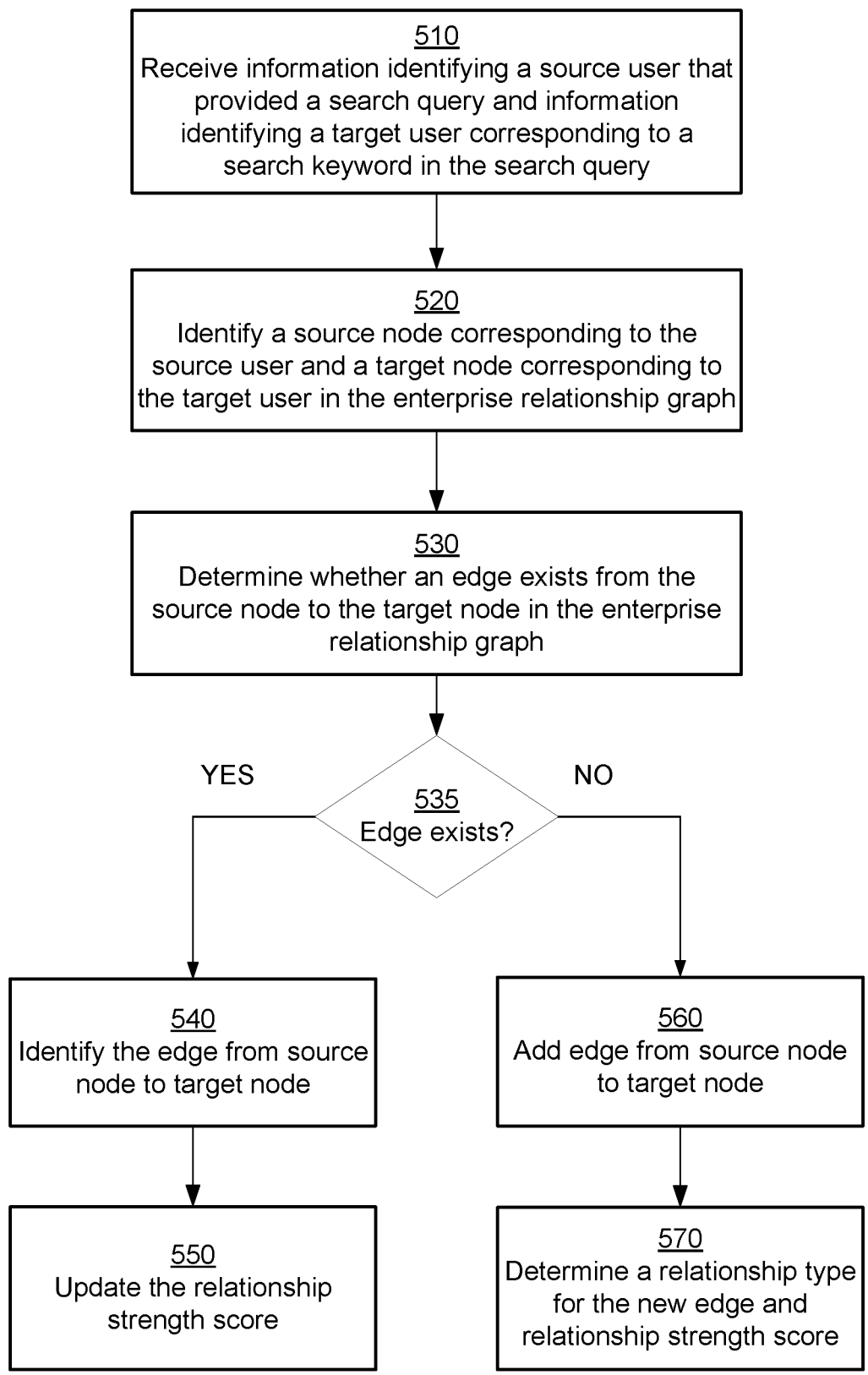
FIG. 5 illustrates a process for adding edges to the relationship graph, in accordance with an embodiment.

FIG. 5 illustrates a process for adding edges to the relationship graph, in accordance with an embodiment. The search module 130 receives 510 information identifying a source user that provided a search query and information identifying target user corresponding to a search keyword in the search query. The search module 130 identifies 520 a source node corresponding to the source user and a target node corresponding to the target user in the enterprise relationship graph. The search module 130 determines 530 whether an edge exists from the source node to the target node in the enterprise relationship graph.

If the search module 130 determines 535 that an edge exists, the search module 130 identifies 540 the edge from the source node to the target node and uses the information stored in association with the edge for ranking search results based on the search query. In an embodiment, the search module 130 stores information describing the last time at which the data describing the edge was updated, for example, a timestamp indicating the time when the relationship strength score corresponding to the edge was last updated. If the timestamp indicates that the relationship strength score corresponding to the edge was last updated more than a threshold time ago, the search module 130 retrieves latest information used for determining the relationship strength score, determines the relationship strength score based on the latest information, and updates 550 the relationship strength score for the edge.

If the search module 130 determines 535 that an edge does not exist, the search module 130 adds 560 an edge from the source node to the target node. The search module 130 also determines information describing the edge, for example, the relationship type for the edge and the relationship strength score for the edge and updates the edge with the determined data. The search module 130 also stores the current time as the time for updating the data describing the edge.

In an embodiment, the users of the online system are divided into clusters and the set of weights associated with a relationship type used for ranking search results are determined for each cluster of users. For example, a machine learning model used for ranking the search results is trained for each cluster. Accordingly, there is a separate machine learning model for each cluster that is used for ranking the search results. The cluster that has the best match with the source user that provided the search query is selected and the set of weights for that cluster are used for ranking the search results. In an embodiment, the online system 100 determines clusters of users based on an organization hierarchy, for example, groups of users that report to the same manager, teams of users that work on a project, and so on. In other embodiments, the online system 100 determines clusters of users based on features describing the users. Techniques for clustering users and ranking search results based on clusters of users are described in the U.S. patent application Ser. No. 16/118,410, filed on Aug. 30, 2018, which is hereby incorporated by reference in its entirety.

Figure 6:
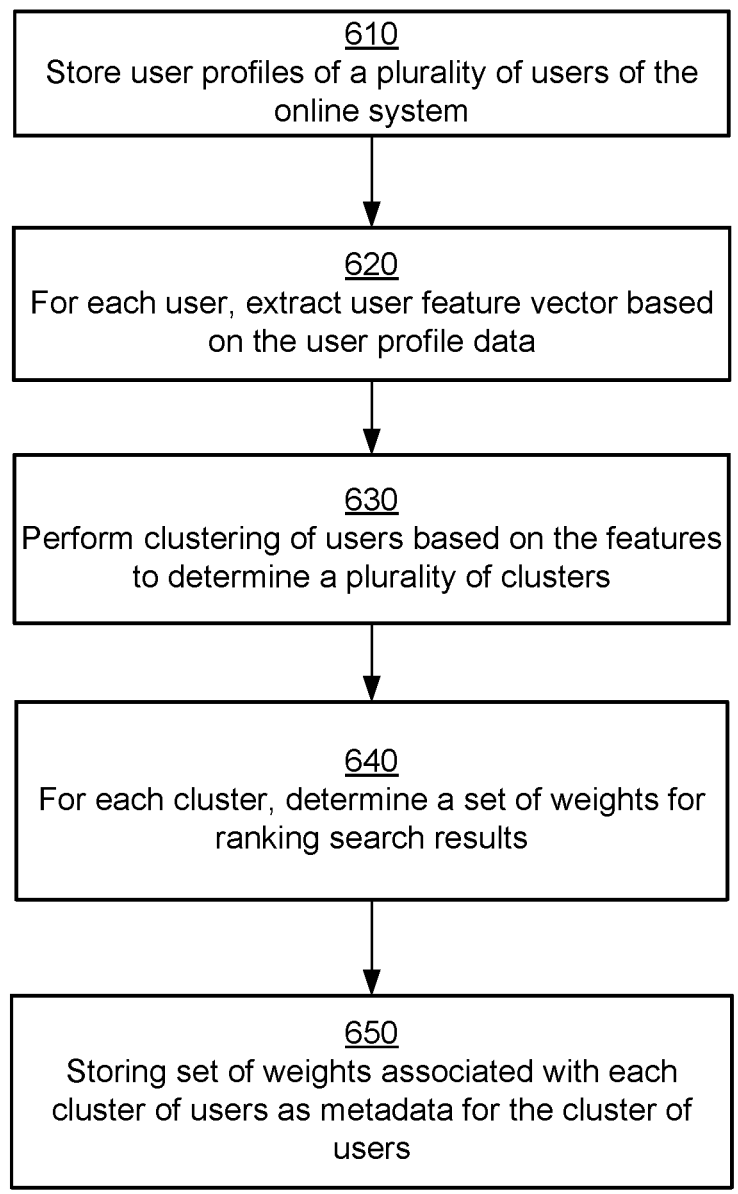
FIG. 6 illustrates the process of determining clusters of users, according to an embodiment.

FIG. 6 illustrates a process for clustering users, in accordance with an embodiment. The online system 100 stores 610 user profiles for a plurality of users in the user profile store 275. The online system 100 extracts 620 user feature vectors for each of the plurality of users. Each user feature vectors is based on user profile data for a user. In an embodiment, each feature of the feature vector represents a value based on a user profile attribute. In another embodiment, the feature vector represents an embedding extracted from a neural network.

The clustering module 285 performs 630 clustering of users (or user profiles corresponding to users) based on the feature vectors representing the users. The clustering module 285 determines a plurality of clusters of users as a result of the clustering. The clustering module 285 stores information describing the clusters in the cluster metadata store 290. Information describing a cluster includes a cluster identifier and statistical information describing aggregate feature vectors for the cluster.

For each cluster, the online system 100 determines 640 a set of weights that are used for ranking of search results. In an embodiment, at least some of the weights from the set of weights are associated with entity types and indicate a likelihood of user interacting with an entity of that entity type from search results. In another embodiment, the online system 100 trains a machine learning model for each cluster, wherein the machine learning model is configured to generate a score used for ranking search results. For example, the machine learning model may receive as set of search results as input and generate scores indicating relevance of each search result. The online system stores the set of weights for each cluster as metadata in the cluster metadata store 290.

Figure 7:
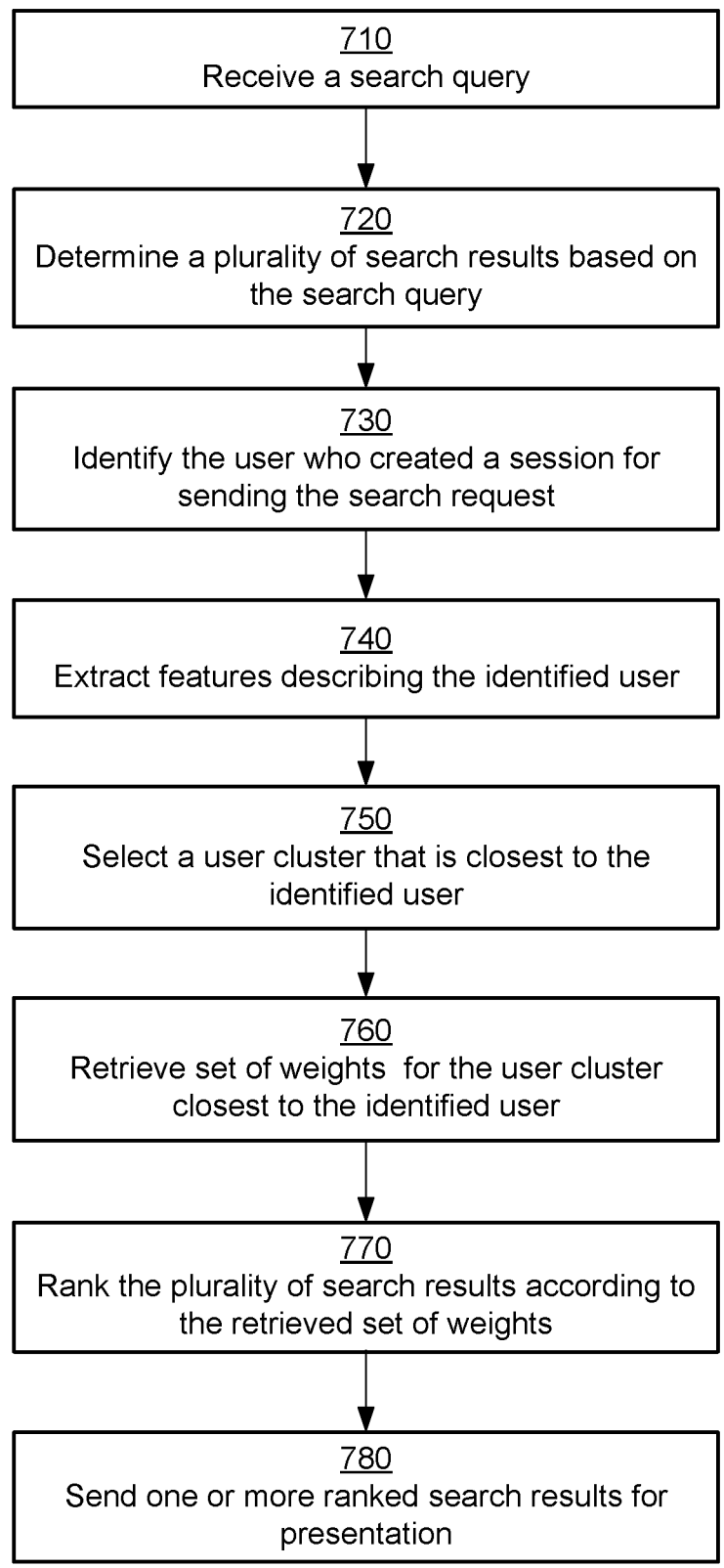
FIG. 7 illustrates the process of ranking search results based on user clusters, according to an embodiment.

FIG. 7 illustrates the process of ranking search results based on the cluster that matches the source user, in accordance with an embodiment. The online system 100 receives 710 a search query and processes it. The search query may be received from a client application 120 executing on a client device 110 via the network 150. In some embodiments, the search query may be received from an external system, for example, another online system via a web service interface provided by the online system 100. The search query comprises a set of search criteria, as detailed supra. The query execution module 220 determines 720 a plurality of search results matching the search query. In an embodiment, the search results represent entities obtained from the object store 160, each entity having an entity type.

In an embodiment, a user creates a session with online system 100 via a client device 110. For example, the user may provide credential such as a user identifier and a password to connect with the online system 100 and then send requests for data to the online system 100. An example, of a user identifier is an email address of the user or a unique alpha numeric string used for uniquely identifying the user in the online system 100. The online system 100 identifies 730 the user who created the session used for sending the search request. The online system 100 may retrieve a user profile or a user account describing the user from the user profile store 275 based on the user identifier.

The online system 100 extracts 740 features describing the identifier user. In an embodiment, the feature extraction module 240 extracts a feature vector based on various attributes of the user profile. In another embodiment, the features are extracted by the feature extraction module 240 by providing user profile information as input to a neural network and extracting an embedding representing a user feature vector from a hidden layer of the neural network.

The online system 100 selects 750 a user cluster that is closest to the identified user. In an embodiment, the online system 100 stores a feature vector representing a centroid of each cluster. The online system determines a distance between the feature vector of the user sending the search request and feature vectors representing centroids of user clusters. The online system 100 compares the various distance values and selects the user cluster corresponding to the smallest distance value. The distance between two vectors may be a Euclidean distance or any other distance measure, for example, Hamming distance or Manhattan distance.

The search module 130 retrieves 760 a set of weights for the selected user cluster. In an embodiment, the set of weights represent an entity type relevance score that indicates a likelihood of a user interacting with a record of that entity type from the search results returned. In an embodiment, the online system determines the entity type relevance score for an entity type as an aggregate of the number of user interactions performed by users with entities of that entity type returned as search results over a plurality of search requests. The aggregate value may represent the percentage of user interactions performed with entities of that particular entity type returned as search results as compared to the total number of user interactions performed by users aggregated over all entity types. Hence, the online system implements a ranking scheme or model comprising weighting search results by entity type for each cluster of similar search queries. The search result ranking module 230 ranks 770 the search results according to the ranking scheme or model, based at least in part on entity type relevance scores. For example, for a given user cluster, if search results of entity type "Account" historically result in more user interactions than search results of entity type "Case" for search queries from that cluster, then subsequent search queries are likely to rank search results comprising entity type "Account" higher than search results of entity type "Case."

In an embodiment, the set of weights represents a machine learning based model for ranking search results. The entity type is incorporated as a feature in the machine learning based model. The search module 130 identifies a machine learning based model corresponding to the cluster of users matching the user profile of the user sending the search query and applies it to the search results. The search module 130 uses the machine learning based model to determine the relevance score for each search result.

The search module 130 ranks 770 the search results based on the relevance scores, for example in descending order by relevance score from greatest to least. The search module 130 sends 660 the ranked search results to the requestor. If the online system 100 ranks the search results, the online system sends the ranked search results are over the network 150 to the client application 120, where the ranked search results are then sent for display.

In an embodiment, the online system is a multi-tenant system and user clusters and the set of weights for each user cluster are determined for each tenant separately.

Computer Architecture

Figure 8:
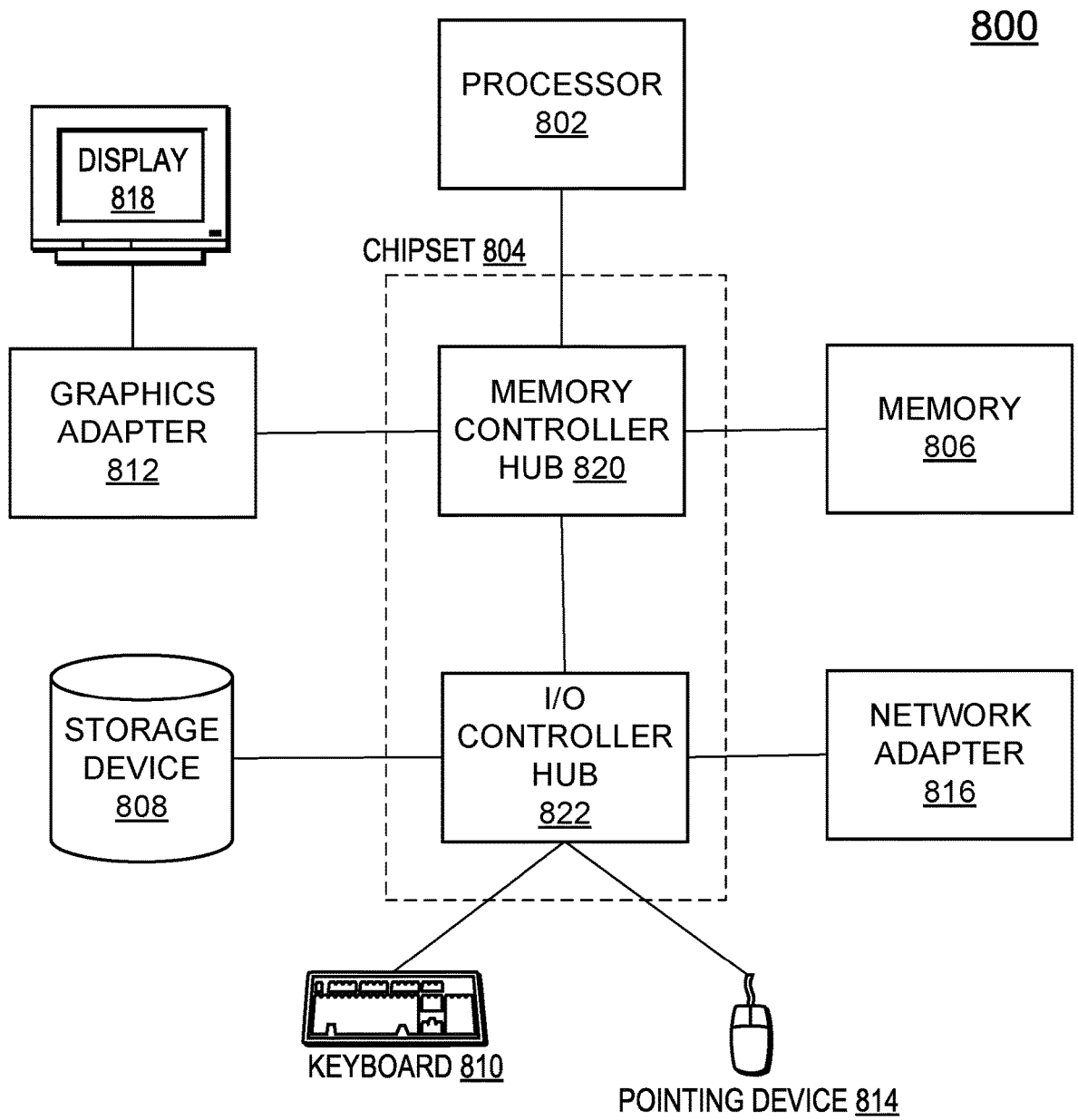
FIG. 8 shows a high-level block diagram of a computer for processing the methods described herein, according to an embodiment.

The entities shown in FIG. 1 are implemented using one or more computers. FIG. 8 is a high-level block diagram of a computer 800 for processing the methods described herein. Illustrated are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer system 800. The graphics adapter 812 displays images and other information on the display 818. The network adapter 816 couples the computer system 800 to the network 150.

As is known in the art, a computer 800 can have different and/or other components than those shown in FIG. 8. In addition, the computer 800 can lack certain illustrated components. For example, the computer acting as the online system 100 can be formed of multiple blade servers linked together into one or more distributed systems and lack components such as keyboards and displays. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

Although various embodiments are described herein in connection with the process of receiving search queries, determining search results, and providing the search results to users, the techniques disclosed herein are applicable to other scenarios based on use of enterprise relationship graph, for example, determining partial query search results, determining query suggestions/reformulations for partial query results or full query results. Some of these embodiments are described as follows.

In one embodiment, the online system 100 determines partial search query results based on enterprise relationship graph. The online system 100 receives a partial search query from a client device, for example, a partial search query as the user is typing the search query. The online system 100 identifies a source user that sent the partial search query and a target user represented by a particular search keyword specified in the partial search query. The online system 100 determines a relationship between the source user and the target user based on the enterprise relationship graph and a relationship strength score for the relationship between the source user and the target user. The online system 100 determines records matching the partial search query, ranks the records based on the relationship strength score and sends the ranked records for display via the client device.

In an embodiment, the online system 100 determines query suggestions for presenting to the user based on the enterprise relationship graph. For example, the online system 100 receives a query or a partial query and determines that the query has an error, for example, a typo or a syntax error. The online system 100 may determine that the query has an error based on incorrect syntax of the query or based on presence of terms that are absent from a dictionary available with the online system 100. A dictionary represents a store of various keywords that are expected to occur as keywords in search queries. Accordingly, the online system 100 determines potential queries that represent a query that the user intended to provide or is likely to prefer over the currently provided query.

In an embodiment, the online system 100 replaces a search query term having a typo with a replacement term that occurs in a dictionary. The online system 100 may identify a plurality of terms, each of the plurality of terms being within a threshold distance of the term with the typo. A distance between two keywords may be determined using the number of characters that need to be changed to obtain one keyword from another.

The online system 100 determines the query suggestions based on enterprise relationship graph. A query suggestion is also referred to as a query reformulation. For example, if the online system 100 identifies a source user that sent a search query and a target user represented by a search keyword specified in the search query, the online system 100 identifies the entity types that are associated with the source user and the target user and modifies the search query to perform search within records of that entity type. The online system 100 presents the modified query as a query suggestion to the user.

In an embodiment, the online system provides query suggestions or reformulations in response to receiving partial queries. Accordingly, the query suggestions represent a complete query that could replace the partial query provided by the user. Alternatively, the online system may provide query suggestions or reformulations in response to receiving complete queries. Accordingly, the query suggestions or reformulations represent alternate queries that the user can use instead of the original search query, for example, because they provide a better formulation of the query that the user provided or because the query suggestions or reformulations correct an error in the query provided by the user. In these embodiments, the online system sends the query suggestions to the client device to be presented as a user interface that poses a question "did you mean" the following query instead and provides a widget that allows the user to select an alternate query, for example, a radio button, a drop down list, or one or more checkboxes.

In one embodiment, various steps of processes described in FIGS. 4-7 are performed by the client device. For example, the client device may store records previously received from the online system, for example, as a result of search queries previously sent by the user via the client device or as a result of other operations performed by the user via the client device such as browsing records via a client application. Accordingly the client device retrieves search results for the search query based on records stored in local storage of the client device. The client device may invoke an API of the online system 100 to retrieve information based on the enterprise relationship graph.

Alternative Embodiments

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative structural and functional designs for a system and a process based on the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

I claim:

1. A computer implemented method for ranking search results, the method comprising:
    receiving, by an online system from a client device, a request to create a session, wherein the online system stores records, wherein a record has one of a plurality of entity types, wherein the online system is used by a plurality of users associated with an enterprise;
    identifying a source user that created the session;
    receiving, by the online system, a search query from the source user, via the session created by the source user, the search query comprising a plurality of search keywords including a particular search keyword identifying one or more target users and one or more remaining search keywords;
    identifying a target user matching the particular search keyword;
    determining a relationship between the source user and the target user based on an enterprise relationship graph specifying relationships between the plurality of users;
    determining a relationship strength score for the relationship between the source user and the target user, the relationship strength score determined based on interactions between the source user and the target user;
    identifying one or more entity types associated with the source user and the target user;
    determining a plurality of records of the one or more entity types associated with the source user and the target user wherein the plurality of records match the one or more remaining search keywords of the search query;
    ranking the plurality of records based on features comprising the determined relationship strength score; and
    transmitting one or more ranked records for display via the client device.

2. The method of claim 1, further comprising:
    determining a relationship type for the determined relationship between the source user and the target user, wherein the features used for ranking the plurality of records further comprise the determined relationship type.

3. The method of claim 2, wherein determining the relationship strength score for the relationship between the source user and the target user comprises:
    determining a rate of user interactions between the source user and the target user;
    accessing an expected rate of interactions between users related by the determined relationship type; and
    determining the relationship strength score for the relationship between the source user and the target user based on a comparison of the determined rate of user interactions between the source user and the target user and the expected rate of interactions.

4. The method of claim 2, wherein determining the relationship strength score for the relationship between the source user and the target user comprises:
    monitoring a rate of user interactions between the source user and the target user;
    accessing an expected rate of user interactions between users related by the determined relationship type; and
    determining the relationship strength score for the relationship between the source user and the target user based on a comparison of the monitored rate of user interactions between the source user and the target user and the expected rate of user interactions.

5. The method of claim 1, wherein determining the relationship strength score for the relationship between the source user and the target user comprises:
    determining a last interaction between the source user and the target user; and
    determining the relationship strength score for the relationship between the source user and the target user based on an age of the last interaction between the source user and the target user.

6. The method of claim 1, wherein determining the relationship strength score for the relationship between the source user and the target user comprises:
    determining measure of distance between the source user and the target user within an organization hierarchy tree; and
    determining the relationship strength score for the relationship between the source user and the target user based on the measure of distance.

7. The method of claim 1, wherein determining the relationship strength score for the relationship between the source user and the target user comprises determining a weighted aggregate of factors including:
    a measure of distance between the source user and the target user within an organization hierarchy tree;
    an age of a last interaction between the source user and the target user; and
    a rate of interaction between the source user and the target user.

8. The method of claim 1, wherein ranking the plurality of records comprises:
    accessing a set of weights, the set of weights determined based on features comprising the determined relationship strength score; and
    ranking the plurality of records based on the set of weights.

9. The method of claim 8, wherein the set of weights comprise weights representing relevance scores for entity types, the relevance score for a particular entity type indicative of a likelihood of a particular user interacting with a particular record of the particular entity type.

10. The method of claim 8, wherein the set of weights represent a machine learning model for ranking search results returned by an input search query.

11. The method of claim 1, wherein determining the relationship between the source user and the target user comprises:
- determining in the enterprise relationship graph, a source node corresponding to the source user and a target node corresponding to the target user;
- determining whether there is an edge between the source node and the target node in the enterprise relationship graph;
- determining that there is no edge between the source user and target user; and
- updating the enterprise relationship graph by adding a new edge between the source user and the target user.

12. The method of claim 11, further comprising:
- determining a relationship type for the determined relationship between the source user and the target user; and
- annotating the edge between the source user and the target user with the relationship type.

13. The method of claim 12, wherein determining the relationship type for the determined relationship between the source user and the target user comprises:
- identifying the source user and the target user in an organization hierarchy tree associated with the enterprise; and
- determining the relationship type for the relationship between the source user and the target user based on a connection between the source user and the target user within the organization hierarchy tree.

14. The method of claim 12, wherein determining the relationship type for the determined relationship between the source user and the target user comprises:
- identifying interactions between the source user and the target user, the interactions associated with the enterprise; and
- determining the relationship type for the relationship between the source user and the target user based on the interactions between the source user and the target user.

15. The method of claim 11, further comprising:
- modifying the search query to perform search within records of the one or more entity types associated with the source user and the target user.

16. The method of claim 1, further comprising:
- determining a feature vector based on a user profile of the source user, the feature vector comprising a plurality of features;
- comparing the feature vector with each of a plurality of clusters of user profiles, wherein a cluster of user profiles represents similar users; and
- selecting, based on comparing of the feature vector with each of the plurality of clusters of user profiles, a cluster of users matching the feature vector of the user profile.

17. The method of claim 1, wherein a user is determined to be associated an entity type based on a number of user interactions with search results of that entity type.

18. The method of claim 17, further comprising:
- determining a weight for each of the one or more entity types based on the relationship strength score, wherein the features used for ranking the plurality of records further comprises the weights of each of the one or more entity types.

19. A non-transitory computer-readable storage medium storing computer program instructions that when executed by one or more electronic processors, cause the one or more electronic processors to perform operations comprising:
- receiving, by an online system from a client device, a request to create a session, wherein the online system stores records, wherein a record has one of a plurality of entity types, wherein the online system is used by a plurality of users associated with an enterprise;
- identifying a source user that created the session;
- receiving, by the online system, a search query from the source user via the session created by the source user, the search query comprising a plurality of search keywords including a particular search keyword identifying one or more target users and one or more remaining search keywords;
- identifying target user matching the particular search keyword;
- determining a relationship between the source user and the target user based on an enterprise relationship graph specifying relationships between the plurality of users;
- determining a relationship strength score for the relationship between the source user and the target user, the relationship strength score determined based on interactions between the source user and the target user;
- identifying one or more entity types associated with the source user and the target user;
- determining a plurality of records of the one or more entity types associated with the source user and the target user wherein the plurality of records match the one or more remaining search keywords of the search query;
- ranking the plurality of records based on features comprising the determined relationship strength score; and
- transmitting one or more ranked records for display via the client device.

20. A computer system comprising:
- one or more electronic processors; and
- a non-transitory computer-readable storage medium storing computer program instructions that when executed by the one or more electronic processors, cause the one or more electronic processors to perform operations comprising:
  - receiving, by an online system from a client device, a request to create a session, wherein the online system stores records, wherein a record has one of a plurality of entity types, wherein the online system is used by a plurality of users associated with an enterprise;
  - identifying a source user that created the session;
  - receiving, by the online system, a search query from the source user via the session created by the source user, the search query comprising a plurality of search keywords including a particular search keyword identifying one or more target users and one or more remaining search keywords;
  - identifying a target user matching the particular search keyword;
  - determining a relationship between the source user and the target user based on an enterprise relationship graph, specifying relationships between the plurality of users;
  - determining a relationship strength score for the relationship between the source user and the target user, the relationship strength score determined based on interactions between the source user and the target user;
  - identifying one or more entity types associated with the source user and the target user;
  - determining a plurality of records of the one or more entity types associated with the source user and the target user wherein the plurality of records match the one or more remaining search keywords of the search query;

ranking the plurality of records based on features comprising the determined relationship strength score; and transmitting one or more ranked records for display via the client device.

* * * * *